US011252718B2

(12) United States Patent
Abedini et al.

(10) Patent No.: US 11,252,718 B2
(45) Date of Patent: Feb. 15, 2022

(54) CONFIGURATION OF RESOURCE PATTERNS FOR INTEGRATED ACCESS AND BACKHAUL

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Muhammad Nazmul Islam, Littleton, MA (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,425

(22) Filed: Oct. 30, 2019

(65) Prior Publication Data

US 2020/0145993 A1    May 7, 2020

Related U.S. Application Data

(60) Provisional application No. 62/754,436, filed on Nov. 1, 2018.

(51) Int. Cl.
*H04W 72/04* (2009.01)
*H04W 40/00* (2009.01)
*H04L 5/00* (2006.01)

(52) U.S. Cl.
CPC ......... *H04W 72/044* (2013.01); *H04L 5/0032* (2013.01); *H04L 5/0094* (2013.01); *H04W 40/00* (2013.01); *H04W 72/0426* (2013.01)

(58) Field of Classification Search
CPC ............ H04B 7/2606; H04B 7/15592; H04W 72/0446; H04W 72/044; H04W 72/0426; H04L 5/0094; H04L 5/0032
See application file for complete search history.

(56) References Cited

U.S. PATENT DOCUMENTS

| 10,924,212 B2 | 2/2021 | Cao et al. |
| 2014/0036804 A1 | 2/2014 | Chen et al. |
| 2016/0344527 A1* | 11/2016 | Blankenship ........... H04W 4/70 |

(Continued)

FOREIGN PATENT DOCUMENTS

WO    WO-2018048642 A1    3/2018

OTHER PUBLICATIONS

"Final Report of 3GPP TSG RAN WG1 #94bis v1.0.0", 3GPP, (Chengdu, China, dated Oct. 8th-12h, 2018) (Year: 2018).*

(Continued)

*Primary Examiner* — Omer S Mian
(74) *Attorney, Agent, or Firm* — Harrity & Harrity, LLP\Qualcomm Incorporated

(57) ABSTRACT

Various aspects of the present disclosure generally relate to wireless communication. In some aspects, an integrated access and backhaul (IAB) node may receive at least part of a resource pattern of a child IAB node associated with the IAB node. The resource pattern may indicate one or more configurations of one or more resources of the child IAB node. The IAB node may communicate with the child IAB node based on the at least part of the resource pattern. Numerous other aspects are provided.

36 Claims, 11 Drawing Sheets

(56) References Cited

U.S. PATENT DOCUMENTS

| | | | |
|---|---|---|---|
| 2017/0323343 | A1 | 11/2017 | Dey et al. |
| 2018/0302899 | A1* | 10/2018 | Aijaz .................. H04W 74/004 |
| 2019/0021032 | A1* | 1/2019 | Bergstrom ............ H04W 36/14 |
| 2019/0141762 | A1* | 5/2019 | Novlan ................. H04W 76/12 |
| 2019/0150213 | A1 | 5/2019 | Kim |
| 2019/0349079 | A1* | 11/2019 | Novlan ............. H04W 72/1263 |
| 2020/0084688 | A1* | 3/2020 | Mildh ................... H04W 76/12 |
| 2020/0100124 | A1 | 3/2020 | Hampel et al. |
| 2020/0145991 | A1 | 5/2020 | Abedini et al. |
| 2020/0145992 | A1 | 5/2020 | Abedini et al. |
| 2020/0146099 | A1 | 5/2020 | Abedini et al. |
| 2021/0195674 | A1 | 6/2021 | Park et al. |

OTHER PUBLICATIONS

International Search Report and Written Opinion—PCT/US2019/059229—ISA/EPO—dated Feb. 7, 2020.
Qualcomm Incorporated: "IAB Resource Management", 3GPP Draft; R1-1809444, 3rd Generation Partnership Project (3GPP), Mobile Competence Centre ; 650, Route Des Lucioles; F-06921 Sophia-Antipolis Cedex; France, vol. Ran WG1, No. Gothenburg, Sweden; Aug. 20, 2018-Aug. 24, 2018, Aug. 17, 2018 (Aug. 17, 2018), 6 pages, XP051516809, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3.
Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5, Sections 2-3, Chapter 2.1 "Indication of Resource Partition Pattern", 2.2 Interaction between Resource Partition Pattern and Rel15 Resource Allocation, pp. 5-7, Chapter 2.3 "Dynamic Coordination with Extended SFI and UL Feedback", Chapter 3 "Conclusion".
CATT: "NR Physical Layer Design for IAB Backhaul Link", 3GPP Draft, 3GPP TSG RAN WG1 Meeting #94bis, R1-1810538_IAB, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018, XP051517946, 7 pages, Retrieved from the Internet: URL: http://www.3gpp.org/ftp/tsg%5Fran/WG1%5FRL1/TSGR1%5F94b/Docs/R1%2D1810538%2Ezip [retrieved on Sep. 29, 2018] the whole document.
Ericsson: "Resource Allocation and Scheduling of IAB Networks", 3GPP Draft, 3GPP TSG-RAN WG1 Meeting #94bis, R1-1811513, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations.<span id="_wysihtml5-undo" class="_wysihtml5-temp">.
Ericsson: "Timing of IAB-node Transmissions," 3GPP Draft, 3GPP TSG-RAN WG1 Meeting #94bis, R1-1811449, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518852, 4 pages, Retrieved from the Internet: URL: http://www.3gpp.org/ftp/tsg%5Fran/WG1%5FRL1/TSGR1%5F94b/Docs/R1%2D1811449%2Ezip [retrieved on Sep. 28, 2018], 2 Discussion.
Ericsson: "Updated Summary of 7.2.3.1 Enhancements to Support NR Backhaul links", 3GPP TSG RAN WG1 Meeting #94bis, 3GPP Draft; R1-1812042, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Oct. 12, 2018, XP051519366, Retrieved from the Internet: URL:http://www.3gpp.org/ftp/tsg%5Fran/WG1%5FRL1/TSGR1%5F94b/Docs/R1%2D1812042%2Ezip [retrieved on Oct. 12, 2018], pp. 3-4, Vivo, pp. 9-15, 3 Dynamic resource allocation between backhaul and access links, 22 pages.
Ericsson: "Physical Layer Aspects of IAB," 3GPP Draft, 3GPP TSG-RAN WG1 Meeting #94bis, R1-1811512, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 28, 2018 (Sep. 28, 2018), XP051518914, 4 pages, Retrieved from the Internet: URL: http://www.3gpp.org/ftp/tsg%5Fran/WG1%5FRL1/TSGR1%5F94b/Docs/R1%2D1811512%2Ezip [retrieved on Sep. 28, 2018] Observation 4.
Intel Corporation: "PHY Enhancements for NR IAB," 3GPP Draft, 3GPP TSG RAN WG1 #94bis, R1-1810770, 3rd Generation Partnership Project (3GPP), Mobile Competence Centre, 650, Route Des Lucioles, F-06921, Sophia-Antipolis Cedex, France, vol. RAN WG1, Oct. 8, 2018-Oct. 12, 2018, Sep. 29, 2018 (Sep. 29, 2018), pp. 1-13, XP051518175, Retrieved from the Internet URL:http://www.3gpp.org/ftp/tsg%5Fran/WG1%5FRL1/TSGR1%5F94b/Docs/R1%2D1810770%2Ezip sections 3, 3.1, 3.2, 5, 5.2, 5.3.
NEC: "Discussion on IAB", 3GPP Draft, 3GPP TSG RAN WG1 Meeting #94b, R1-1810806, Discussion on IAB, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518211, 2 pages, Retrieved from the Internet: URL:http://www.3gpp.org/ftp/tsg%5Fran/WG1%5FRL1/TSGR1%5F94b/Docs/R1%2D1810806%2Ezip [retrieved on Sep. 28, 2018], sections 1, 3.
NEC: "Resource Allocation for NR PUCCH", 3GPP Draft, 3GPP TSG RAN WG1 Meeting 91, R1-1720380 PUCCH_RESOURCE_ALLOCATION_V3E, 3rd Generation Partnership Project (3GPP), Mobile Competence Centre, 650, Route Des Lucioles, F-06921 Sophia-Antipolis Cedex, France, vol. RAN WG1, No. Reno, Nevada; Nov. 27, 2017-Dec. 1, 2017, Nov. 18, 2017, XP051369943, Retrieved from the Internet: URL:http://www.3gpp.org/ftp/tsg%5Fran/WG1%5FRL1/TSGR1%5F91/Docs/ [retrieved on Nov. 18, 2017], 8 pages.
Qualcomm Incorporated: "IAB Resource Partitioning for Architecture Group 1", 3GPP Draft, 3GPP TSG RAN WG2 Meeting #102, R2-1808006 IAB Resource Partitioning for Architecture Group 1, 3rd Generation Partnership Project (3GPP), Mobile Competence Centre, 650, Route Des Lucioles, F-06921 Sophia-Antipolis Cede, vol. RAN WG2, No. Busan, South Korea, May 21, 2018-May 25, 2018, May 20, 2018 (May 20, 2018), XP051444329, 3 pages, Retrieved from the Internet: URL: http://www.3gpp.org/ftp/Meetings%5F3GPP%5FSYNC/RAN2/Docs/[retrieved on May 20, 2018], p. 2, figure 2, figures 1, 2, sections 1, 2.
Qualcomm Incorporated: "Resource Allocation and Transmit Diversity for PUCCH", 3GPP Draft, 3GPP TSG RAN WG1 Meeting #90b, R1-1718566 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341747, 14 pages, Retrieved from the Internet:URL:http://www.3gpp.org/ftp/Meetings_3GPP_SYNC/RAN1/Docs/, [retrieved on Oct. 8, 2017], figures 1,2, sections 1, 2.
Qualcomm Incorporated: "Resource Allocation for PUCCH," 3GPP Draft, 3GPP TSG RAN WG1 Meeting #91, R1-1720686 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Reno, US; Nov. 27, 2017-Dec. 1, 2017, Nov. 18, 2017, XP051370147, 22 pages, Retrieved from the Internet: URL: http://www.3gpp.org/ftp/tsg%5Fran/WG1%5FRL1/TSGR1%5F91/Docs/ [retrieved on Nov. 18, 2017].

(56) References Cited

OTHER PUBLICATIONS

VIVO: "Enhancements to Support NR Backhaul Link", 3GPP Draft, 3GPP TSG RAN WG1 Meeting #94bis, R1-1810387, Enhancements to Support NR Backhaul Link-Final, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051517796, pp. 1-9, Retrieved from the Internet : URL:http://www.3gpp.org/ftp/tsg%5Fran/WG1%5FRL1/TSGR1%5F94b/Docs/R1%2D1810387%2Ezip [Retrieved on Sep. 29, 2018], sections 2.1.1, 2.2.1, 2.3.1, 2.3.2, 2.5.

MCC Support: "Draft Report of 3GPP TSG RAN WG1 #94bis v0.1.0", 3GPP TSG RAN WG1 Meeting #95, R1-181xxxx, Spokane, USA, Nov. 12-16, 2018, 190 Pages (submission date: Oct. 16, 2018).

\* cited by examiner

CONFIGURATION OF RESOURCE PATTERNS FOR INTEGRATED ACCESS AND BACKHAUL

CROSS-REFERENCE TO RELATED APPLICATION

This application claims priority to U.S. Provisional Patent Application No. 62/754,436, filed on Nov. 1, 2018, entitled "CONFIGURATION OF RESOURCE PATTERNS FOR INTEGRATED ACCESS AND BACKHAUL," which is hereby expressly incorporated by reference herein.

INTRODUCTION

Aspects of the present disclosure generally relate to wireless communication, and to techniques and apparatuses for configuration of resources for a network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by an integrated access and backhaul (IAB) node, may include receiving at least part of a resource pattern of a child IAB node associated with the IAB node, the resource pattern indicating one or more configurations of one or more resources of the child IAB node. The method may include communicating with the child IAB node based on the at least part of the resource pattern.

In some aspects, an IAB node may include memory and one or more processors coupled to the memory. The memory and the one or more processors may be configured to receive at least part of a resource pattern of a child IAB node associated with the IAB node, the resource pattern indicating one or more configurations of one or more resources of the child IAB node. The memory and the one or more processors may be configured to communicate with the child IAB node based on the at least part of the resource pattern.

In some aspects, a non-transitory computer-readable medium may store one or more instructions for wireless communication. The one or more instructions, when executed by one or more processors of an IAB node, may cause the one or more processors to receive at least part of a resource pattern of a child IAB node associated with the IAB node, the resource pattern indicating one or more configurations of one or more resources of the child IAB node. The one or more instructions, when executed by one or more processors of an IAB node, may cause the one or more processors to communicate with the child IAB node based on the at least part of the resource pattern.

In some aspects, an apparatus for wireless communication may include means for receiving at least part of a resource pattern of a child IAB node associated with the apparatus, the resource pattern indicating one or more configurations of one or more resources of the child IAB node. The apparatus may include means for communicating with the child IAB node based on the at least part of the resource pattern.

In some aspects, a method of wireless communication, performed by an integrated access and backhaul (IAB) device, may include identifying a resource pattern of one or more child IAB nodes associated with an IAB node, the resource pattern indicating one or more configurations of one or more resources of the one or more child IAB nodes. The method may include transmitting information indicating at least part of the resource pattern to the IAB node.

In some aspects, an IAB device may include memory and one or more processors coupled to the memory. The memory and the one or more processors may be configured to identify a resource pattern of one or more child IAB nodes associated with an IAB node, the resource pattern indicating one or more configurations of one or more resources of the one or more child IAB nodes. The memory and the one or more processors may be configured to transmit information indicating at least part of the resource pattern to the IAB node.

In some aspects, a non-transitory computer-readable medium may store one or more instructions for wireless communication. The one or more instructions, when executed by one or more processors of an IAB device, may cause the one or more processors to identify a resource pattern of one or more child IAB nodes associated with an IAB node, the resource pattern indicating one or more configurations of one or more resources of the one or more child IAB nodes. The one or more instructions, when executed by one or more processors of an IAB device, may cause the one or more processors to transmit information indicating at least part of the resource pattern to the IAB node.

In some aspects, an apparatus for wireless communication may include means for identifying a resource pattern of one or more child IAB nodes associated with an IAB node, the resource pattern indicating one or more configurations of one or more resources of the one or more child IAB nodes. The apparatus may include means for transmitting information indicating at least part of the resource pattern to the IAB node.

In some aspects, a method of wireless communication, performed by a child integrated access and backhaul (IAB) node, may include receiving at least part of a resource pattern of the child IAB node, the resource pattern indicating one or more configurations of one or more resources of the child IAB node. The method may include transmitting, by the child IAB node and to a parent IAB node associated with the child IAB node, the at least part of the resource pattern.

In some aspects, a child IAB node may include memory and one or more processors coupled to the memory. The memory and the one or more processors may be configured to receive at least part of a resource pattern of the child IAB node, the resource pattern indicating one or more configurations of one or more resources of the child IAB node. The memory and the one or more processors may be configured to transmit, to a parent IAB node associated with the child IAB node, the at least part of the resource pattern.

In some aspects, a non-transitory computer-readable medium may store one or more instructions for wireless communication. The one or more instructions, when executed by one or more processors of child IAB node, may cause the one or more processors to receive at least part of a resource pattern of the child IAB node, the resource pattern indicating one or more configurations of one or more resources of the child IAB node. The one or more instructions, when executed by one or more processors of child IAB node, may cause the one or more processors to transmit, to a parent IAB node associated with the child IAB node, the at least part of the resource pattern.

In some aspects, an apparatus for wireless communication may include means for receiving at least part of a resource pattern of the apparatus, the resource pattern indicating one or more configurations of one or more resources of the apparatus. The apparatus may include means for transmitting, to a parent IAB node associated with the apparatus, the at least part of the resource pattern.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
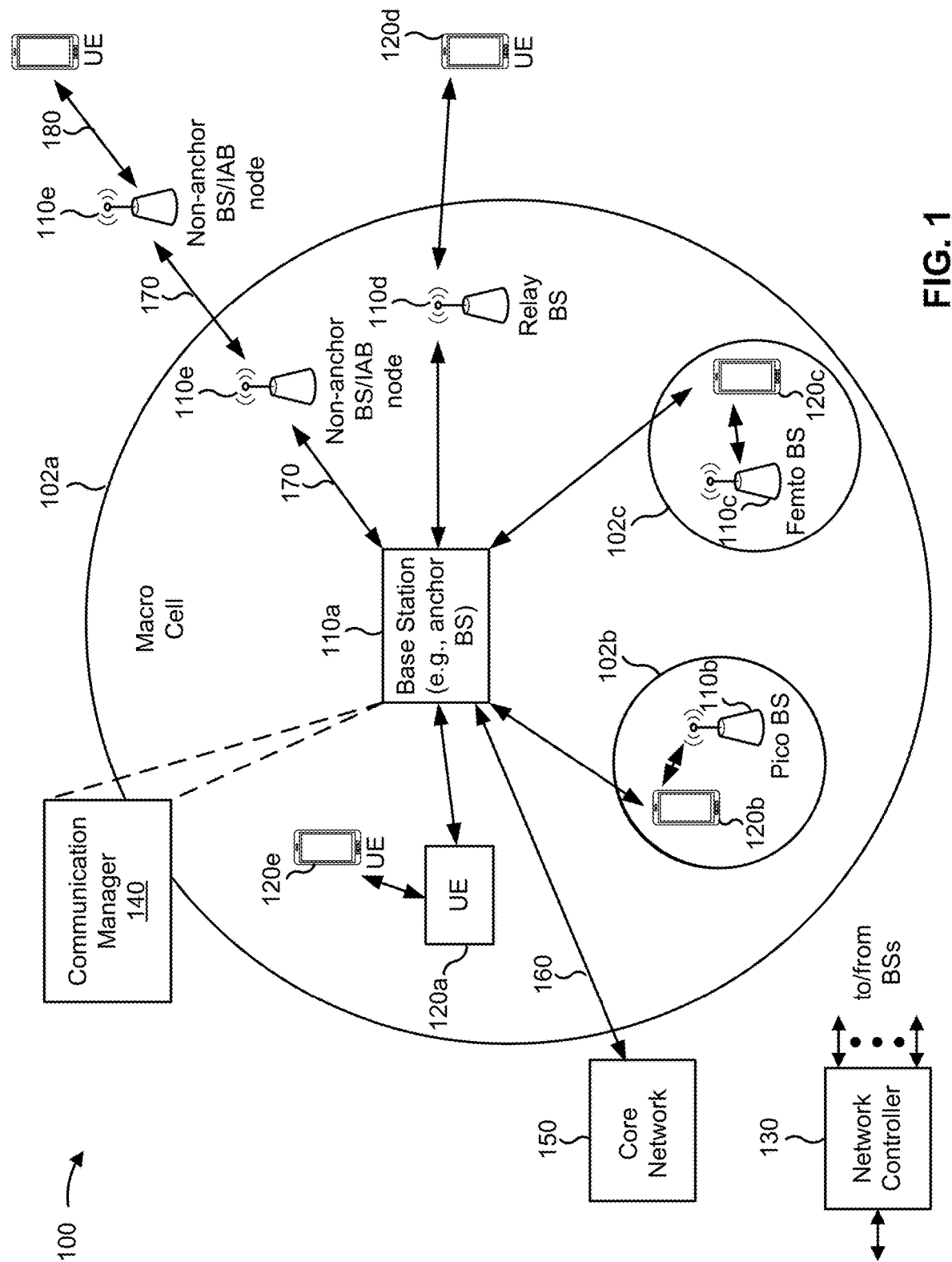
FIG. 1 is a block diagram conceptually illustrating an example of a wireless communication network, in accordance with various aspects of the present disclosure.

An IAB network may include a plurality of IAB nodes. A first IAB node may be a parent node of a second IAB node, and the second IAB node may be referred to as a child node. The parent node may be capable of configuring a resource of the child node as available, schedulable, or non-schedulable for the child node. Such a resource may be referred to as a soft resource. One example of a soft resource is a soft time resource. Some resources of the child node may be unconditionally available for the child node. Such a resource may be referred to as a hard resource.

In some cases, a set of resources (e.g., one or more resources) may be indicated as soft for a parent node, and the parent node may not know whether the set of resources are hard, soft, or unavailable for a child node. In such a case, even if the set of resources are released for use at the parent node (e.g., by a grandparent node or a parent node of the parent node) and become available for the parent node to use (e.g., for a communication with the child node), the parent node may not know whether the child node's resources are indicated as hard, soft, or unavailable to the child node, which may hamper the parent node's usage of the available resources. Furthermore, in some cases, the parent node may provide a release indicator to the child node indicating that the child node can freely schedule the child node's resources, which may be useful (e.g., when the child node's resources are soft resources) or may not be useful (e.g., when the child node's resources are unavailable resources or hard resources). It may be beneficial to provide improved certainty regarding whether the child node's resources can be released using a release indicator.

Some techniques and apparatuses described herein provide for a child node's resource pattern (e.g., whether time resources are hard, soft, or unavailable) to be provided to a parent node of the child node. The resource pattern may indicate a configuration of a resource of the child node, such as whether the resource of the child node is a hard resource (e.g., hard uplink, hard downlink, or hard flexible), unavailable (e.g., non-schedulable by the child node for a child node of the child node), or soft (e.g., schedulable by the child node if a release indication is received). In some aspects, the resource pattern may indicate whether a child node's resource is hard, or whether the child node's time resource is soft or unavailable. In this way, the parent node may know whether a communication can be freely scheduled for the child node (in the case of a soft or unavailable time resource) or cannot be freely scheduled for the child node (in the case of a hard time resource). In some aspects, the resource pattern may indicate whether a child node's resource is hard, soft, or unavailable. In this way, the parent node may know whether a communication can be freely scheduled for the child node, and whether a release indicator would be useful if provided (in the case of a child node's soft resource) or would not be useful if provided (in the case of a child node's hard or unavailable resource), thus improving utilization of network resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the base station 110 may include a communication manager 140. As described in more detail elsewhere herein, the communication manager 140 may receive at least part of a resource pattern of a child IAB node associated with the IAB node, the resource pattern indicating one or more configurations of one or more resources of the child IAB node; communicate with the child IAB node based on the at least part of the resource pattern; identify a resource pattern of one or more child IAB nodes associated with an IAB node, the resource pattern indicating one or more configurations of one or more resources of the one or more child IAB nodes; transmit information indicating at least part of the resource pattern to the IAB node; receive at least part of a resource pattern, the resource pattern indicating one or more configurations of one or more resources of the child IAB node; and transmit, to a parent IAB node associated with the child IAB node, the at least part of the resource pattern. Additionally, or alternatively, the communication manager 140 may perform one or more other operations described herein. In some aspects, the communication manager 140 may be included in network controller 130, or network controller 130 may have a communication manager that performs operations similar to those described as being performed by the communication manager 140.

Base station 110 (e.g., base station 110a or another base station shown in FIG. 1) may connect to a core network 150 via a backhaul 160. For example, the backhaul 160 may be a fiber backhaul. Base station 110a is referred to as an anchor BS in the terminology of an integrated access and backhaul (IAB) network, since base station 110a provides a fiber connection to the core network 150. Base station 110a may communicate with one or more base stations 110e (shown as non-anchor BS/IAB node) via a wireless connection 170. A non-anchor BS is a base station that does not provide a fiber connection to the core network 160. In an IAB network, a series of non-anchor BSs may access the core network 150 via wireless connections 170 and via the backhaul 160. A UE 120 may access the core network via an access link 180. Some techniques and apparatuses described herein provide for a child node's (e.g., BS 110 or UE 120) resource pattern (e.g., whether time resources are hard, soft, or unavailable) to be provided to a parent node (e.g., BS 110) of the child node. The resource pattern may indicate a configuration of a resource of the child node, such as whether the resource of the child node is a hard resource (e.g., hard uplink, hard downlink, or hard flexible), unavailable (e.g., non-schedulable by the child node for a child node of the child node), or soft (e.g., schedulable by the child node if a release indication is received).

As indicated above, FIG. 1 is provided merely as an example. Other examples may differ from what was described with regard to FIG. 1.

Figure 2:
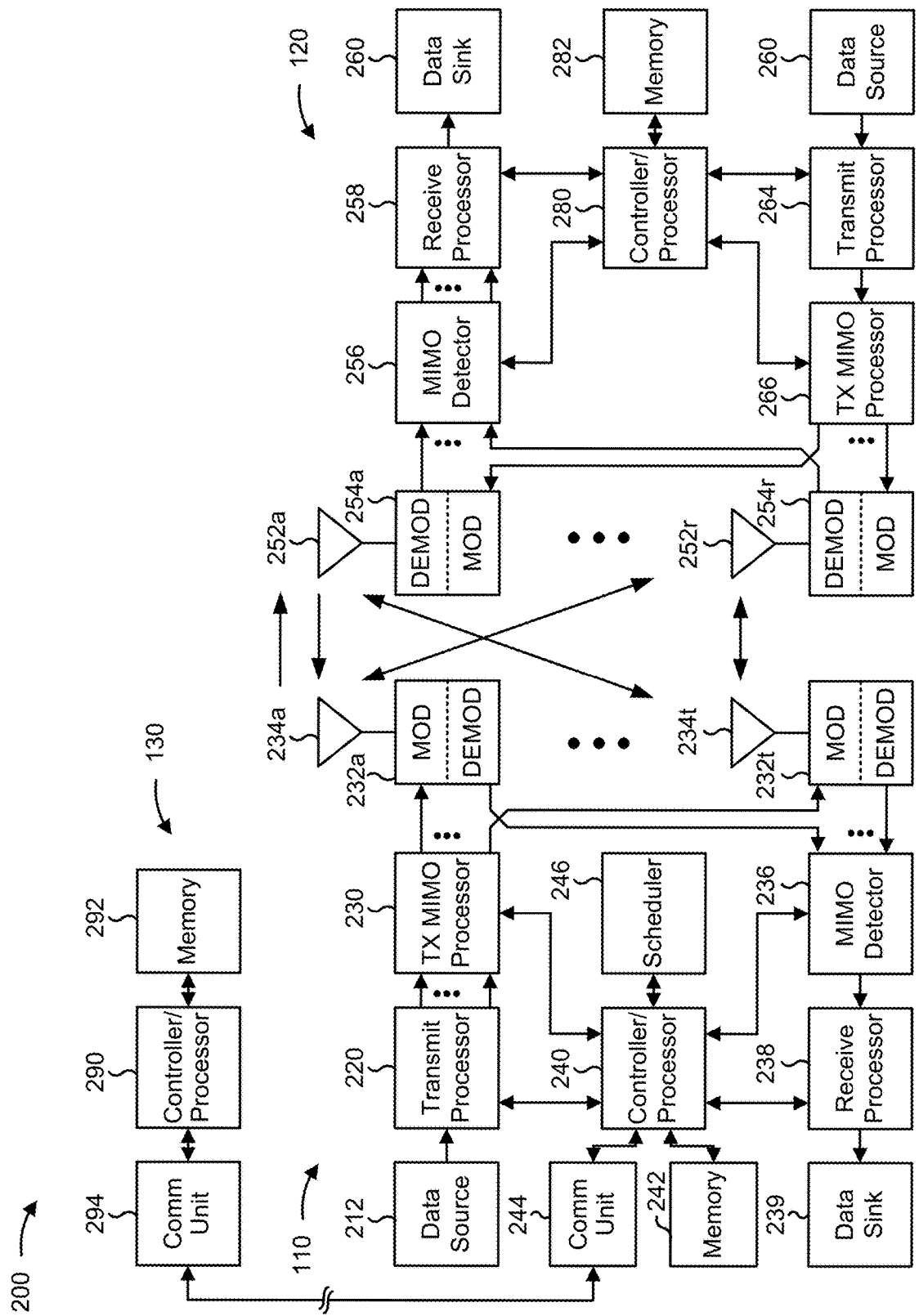
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuration of resource patterns for integrated access and backhaul, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, an IAB node or device (e.g., the base station 110, the UE 120) may include means for receiving at least part of a resource pattern of a child IAB node associated with the IAB node, the resource pattern indicating one or more configurations of one or more resources of the child IAB node; means for communicating with the child IAB node based on the at least part of the resource pattern; means for receiving one or more messages that indicate the at least part of the resource pattern of the child IAB node from a central unit; means for receiving one or more messages from the child IAB node that indicate the at least part of the resource pattern; means for receiving the one or more messages in connection with a request transmitted to the child IAB node by the IAB node; means for determining that the communication with the child IAB node is to be performed using a resource that is available for communication with the child IAB node based at least in part on the resource pattern; means for transmitting a release indication to the child IAB node for a time resource that is included in a set of resources identified by the resource pattern; means for identifying, a resource pattern of one or more child IAB nodes associated with an IAB node, the resource pattern indicating one or more configurations of one or more resources of the one or more child IAB nodes; means for transmitting information indicating at least part of the resource pattern to the IAB node; means for transmitting at least part of the resource pattern of each child IAB node, of the one or more child IAB nodes, to the IAB node; means for transmitting one or more messages indicating at least part of the resource pattern of a child IAB node, of the one or more child IAB nodes, to the child IAB node; means for receiving at least part of a resource pattern of the child IAB node, the resource pattern indicating one or more configurations of one or more resources of the child IAB node; means for transmitting, to a parent IAB node associated with the child IAB node, the at least part of the resource pattern; means for communicating with the parent IAB node based at least in part on the at least part of the resource pattern; means for receiving, from the parent IAB node, a request for the at least part of the resource pattern, wherein transmitting the at least part of the resource pattern is based at least in part on receiving the request; means for receiving a release indication from the parent IAB node for a time resource that is included in a set of resources identified by the resource pattern; and/or the like. Additionally, or alternatively, the base station 110 and/or UE 120 may include means for performing one or more other operations described herein. In some aspects, such means may include the communication manager 140. In some aspects, such means may include one or more components of the base station 110 and/or UE 120 described in connection with FIG. 2.

As indicated above, FIG. 2 is provided merely as an example. Other examples may differ from what was described with regard to FIG. 2.

Figure 3:
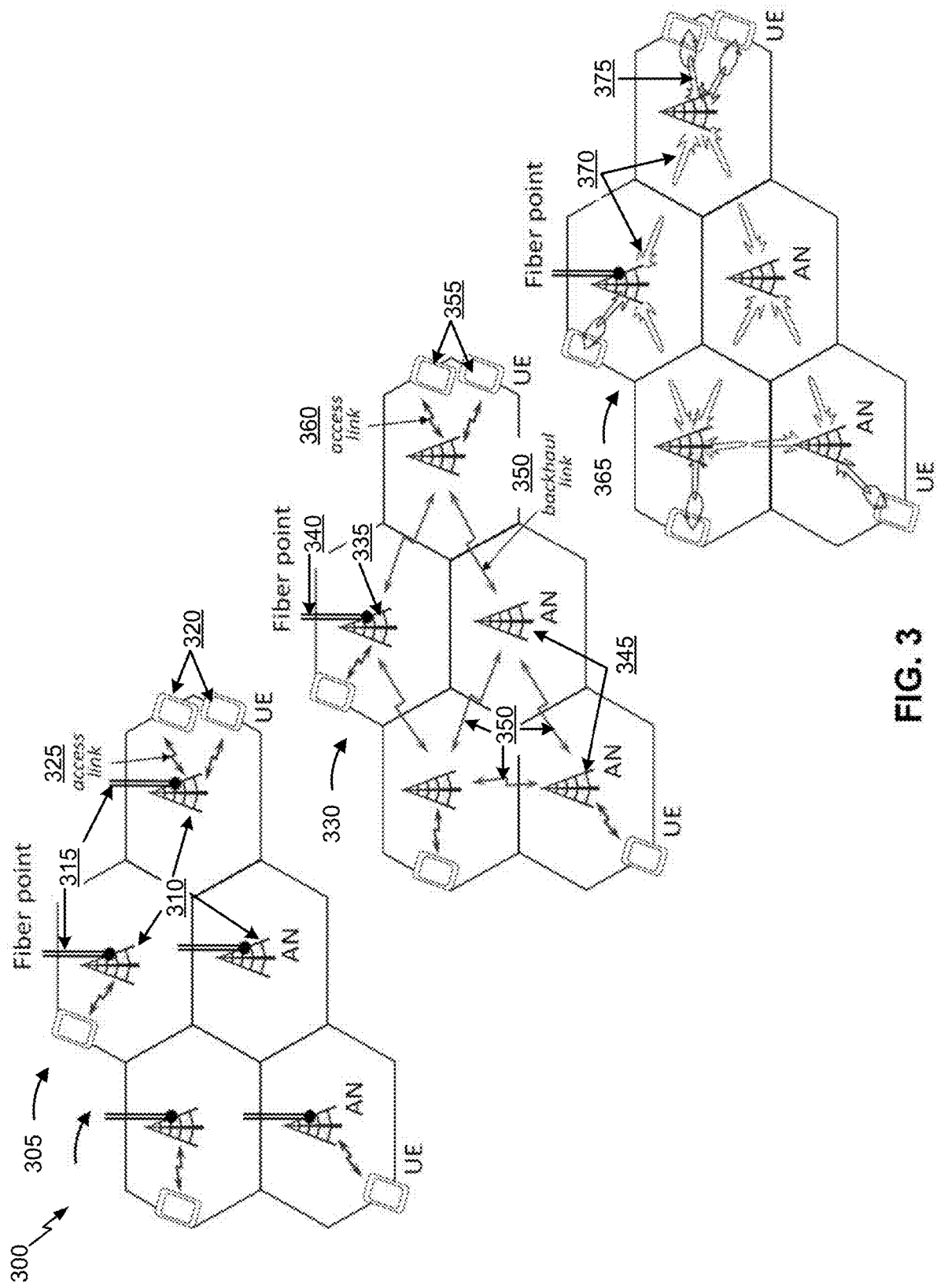
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor), a central entity, a central unit, and/or the like. The IAB network may include one or more non-anchor base stations 345, sometimes referred to as relay base stations, IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples are possible and may differ from what was described with regard to FIG. 3.

Figure 4:
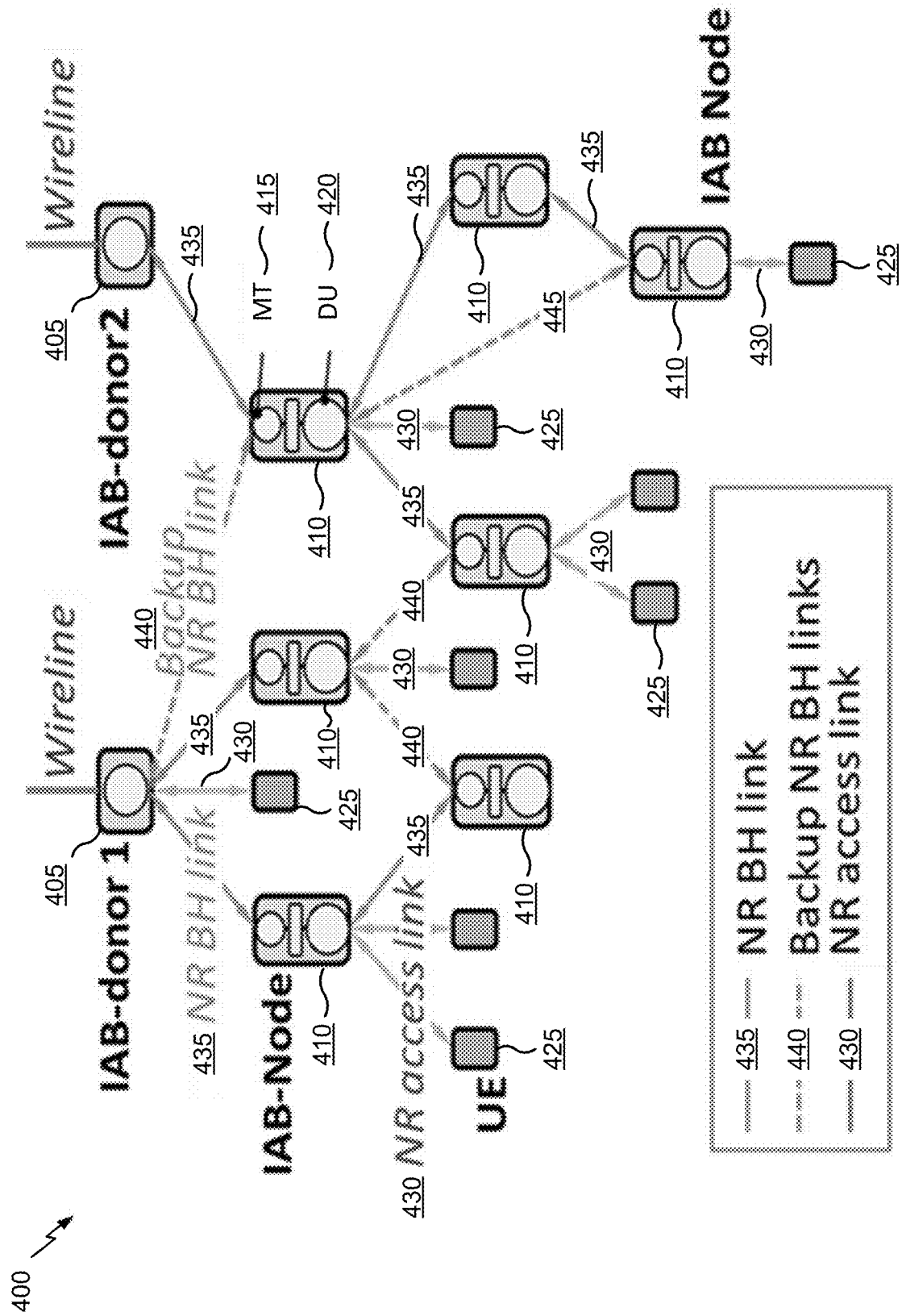
FIG. 4 is a diagram illustrating an example of an integrated access and backhaul (IAB) network architecture, in accordance with various aspects of the disclosure.

FIG. 4 is a diagram illustrating an example 400 of an integrated access and backhaul (IAB) network architecture, in accordance with various aspects of the disclosure.

As shown in FIG. 4, an IAB network may include anchor nodes 405, or IAB donors (shown as IAB-donor), that connect to a core network via a wired connection (shown as wireline). In some aspects, an anchor node 405 may be referred to as a central unit (CU) or a central entity. For example, an Ng interface of an anchor node 405 may terminate at a core network. Additionally, or alternatively, an anchor node 405 may connect to one or more devices of the core network that provide a core access and mobility management function (e.g., AMF). In some aspects, an anchor node 405 may include a base station 110, such as an anchor base station, as described above in connection with FIG. 3.

As further shown in FIG. 4, the IAB network may include non-anchor nodes 410, or IAB nodes (shown as IAB-Node). A non-anchor node 410 may provide integrated access and backhaul functionality, and may include mobile terminal (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 625 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 445 may be used if a primary backhaul link fails, becomes congested, becomes overloaded, and/or the like.

As indicated above, FIG. 4 is provided as an example. Other examples are possible and may differ from what was described with regard to FIG. 4.

Figure 5:
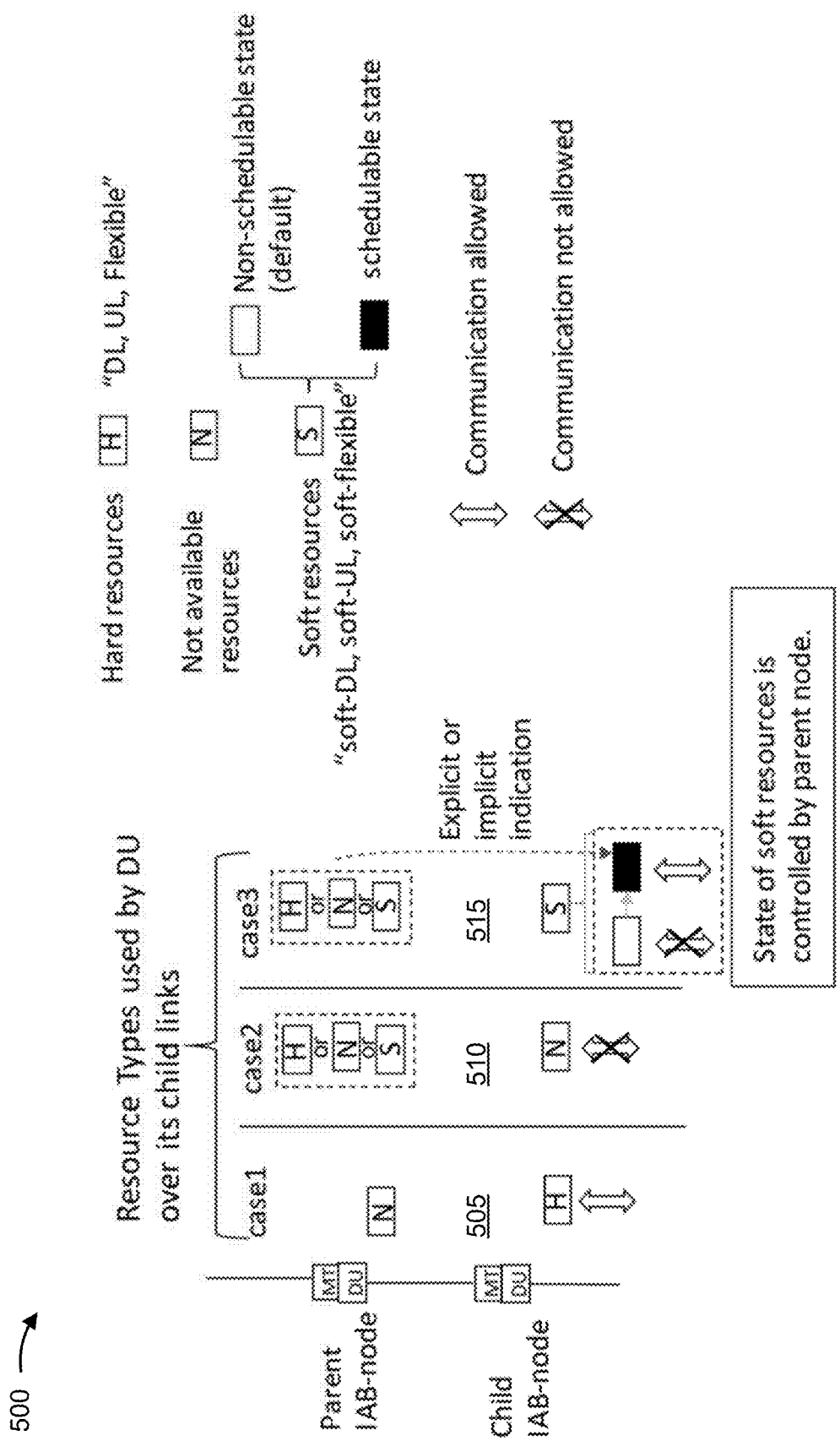
FIG. 5 is a diagram illustrating an example of resource types in an IAB network, in accordance with various aspects of the disclosure.

FIG. 5 is a diagram illustrating an example 500 of resource types in an IAB network, in accordance with various aspects of the disclosure.

In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

A resource pattern may indicate whether resources, associated with an IAB node, are hard, soft, not available, downlink-only, uplink-only, and/or flexible. For example, the resource pattern may include any form of configuration information, control information, semi-static information, and/or the like.

When a time resource is configured as a soft resource for a wireless node, the availability of that time resource is controlled by a parent node of the wireless node. For example, the parent node may indicate (e.g., explicitly or implicitly) whether a soft resource is available for communications of the wireless node. Thus, a soft resource may be in one of two states: a schedulable state (e.g., when the soft resource is available for scheduling and/or communications of the wireless node) and a non-schedulable state (e.g., when the soft resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives a release indication, from the parent node (e.g., explicitly or implicitly), that the time resource is available for use (e.g., released) by the child node. If the child node receives such a release indication, then the child node can schedule communications in that time resource and/or communicate using that time resource.

In some cases, a set of resources (e.g., one or more resources) may be indicated as soft for a parent node, and the parent node may not know whether the set of resources are hard, soft, or unavailable for a child node. In such a case, even if the set of resources are released for use at the parent node (e.g., by a grandparent node or a parent node of the parent node) and become available for the parent node to use (e.g., for a communication with the child node), the parent node may not know whether the child node's resources are indicated as hard, soft, or unavailable to the child node, which may hamper the parent node's usage of the available resources. Furthermore, in some cases, the parent node may provide a release indicator to the child node indicating that the child node can freely schedule the child node's resources, which may be useful (e.g., when the child node's resources are soft resources) or which may not be useful (e.g., when the child node's resources are unavailable resources or hard resources). The uncertainty in whether the child node's resources can be released may lead to inefficiency in network configuration and inefficient allocation of resources.

Some techniques and apparatuses described herein provide for a child node's resource pattern (e.g., whether time resources are hard, soft, or unavailable) to be provided to a parent node of the child node. In some aspects, the resource pattern may indicate whether a child node's resource is hard, or whether the child node's resource is soft or unavailable. In this way, the parent node may know whether a communication can be freely scheduled for the child node (in the case of a soft or unavailable resource) or cannot be freely scheduled for the child node (in the case of a hard resource). In some aspects, the resource pattern may indicate whether a child node's resource is hard, soft, or unavailable. In this way, the parent node may know whether a communication can be freely scheduled for the child node, and whether a release indicator would be useful if provided (in the case of a child node's soft resource) or would not be useful if provided (in the case of a child node's hard or unavailable resource). Thus, network resources utilization may be improved.

As indicated above, FIG. 5 is provided as an example. Other examples are possible and may differ from what was described with regard to FIG. 5.

Figure 6:
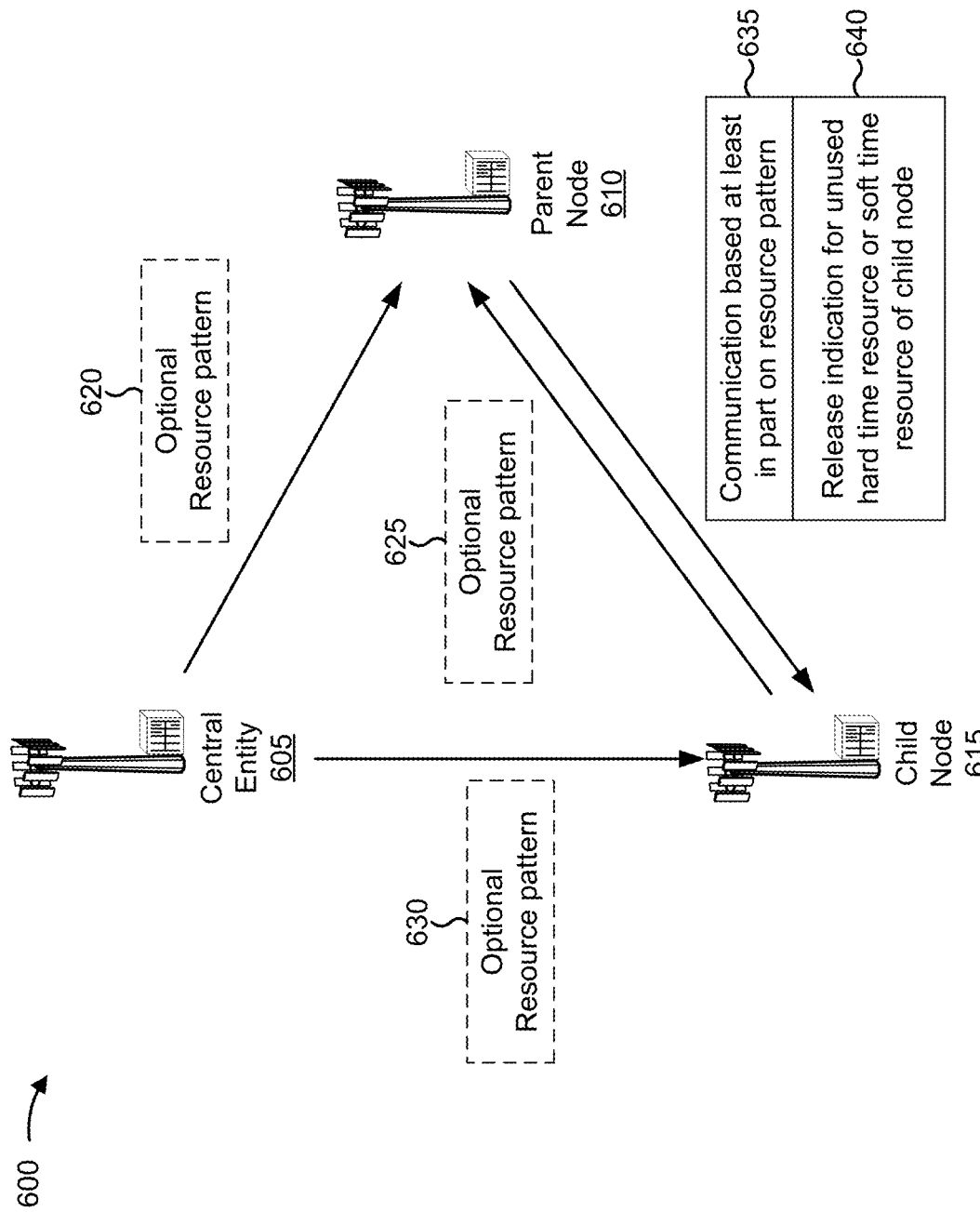
FIG. 6 is a diagram illustrating an example of configuration of resource patterns for IAB, in accordance with various aspects of the present disclosure.

FIG. 6 is a diagram illustrating an example 600 of configuration of resource patterns for IAB, in accordance with various aspects of the present disclosure. As shown, example 600 includes a central entity 605 (e.g., a central unit, BS 110, network controller 130, anchor base station 335, anchor node 405, an IAB device, etc.), a parent node 610 (e.g., BS 110, base station 310, non-anchor base station 345, non-anchor node 410, a DU function 420, an MT function 415, etc.), and a child node 615 (e.g., BS 110, UE 120, base station 310, non-anchor base station 345, non-anchor node 410, a DU function 420, an MT function 415, etc.). In FIG. 6, a single parent node 610 and a single child node 615 are shown. However, the techniques and apparatuses described herein may be implemented in an IAB network with many layers of parent nodes and child nodes and/or many parent nodes or child nodes in a single layer of the IAB network.

As shown in FIG. 6, and by reference number 620, the central entity 605 may optionally provide information identifying a resource pattern to the parent node 610. The resource pattern may be for the child node 615. In some aspects, the resource pattern may indicate whether time resources of the child node are hard time resources (e.g., hard uplink, hard downlink, or hard flexible), unavailable (e.g., non-schedulable by the child node for a child node of the child node), or soft resources (e.g., schedulable by the child node if a release indication is received).

In some aspects, the resource pattern may indicate whether a time resource is of a first group of time resources or a second group of time resources. For example, the first group of time resources may be hard time resources and the second group of time resources may be soft time resources and unavailable time resources. This may conserve signaling overhead in comparison to signaling information identifying hard, soft, and unavailable time resources. Signaling information identifying hard, soft, and unavailable time resources may enable the parent node 610 to identify time resources for which a release indicator must be provided (e.g., soft time resources), as well as time resources for which no resource indicator needs to be provided (e.g., hard or unavailable time resources), thereby more efficiently using network resources.

In some aspects, the central entity 605 may provide the information identifying the resource pattern for the child node 615 to all parent nodes 610 of the child node 615. In some aspects, the central entity 605 may provide the information identifying resource patterns of all child nodes 615 of the parent node 610 to the parent node 610.

In some aspects, the central entity 605 may provide the information identifying the resource pattern via an interface, such as the F1 application protocol (F1-AP) interface. For example, the central entity 605 may provide, to the parent node 610 and via the F1-AP interface, a resource pattern of the parent node 610 and resource patterns of each child node 615 associated with the parent node 610.

As shown by reference number 625, the child node 615 may optionally provide information identifying a resource pattern to the parent node 610. For example, the child node 615 may provide this information via an uplink control channel (e.g., a physical uplink control channel), an uplink data channel (e.g., a physical uplink shared channel), and/or the like. In some aspects, a DU of the child node 615 may provide this information to an MT of the child node 615 (e.g., via an internal interface of the child node 615). The MT may provide this information to a DU of the parent node 610. In some aspects, the child node 615 may provide the information identifying the resource pattern based at least in part on a request. For example, the parent node 610 may provide a request on a downlink to the child node 615 (e.g., via downlink control information, a media access control (MAC) control element (CE), an upper-layer message, and/or the like), and the child node 615 may provide the information identifying the resource pattern in connection with the request.

As shown by reference number 630, the central entity 605 may optionally provide information identifying a resource pattern to the child node 615. For example, the central entity 605 may determine the resource pattern of the child node 615. The central entity 605 may provide information identifying the resource pattern to the child node 615 (e.g., as part of configuration of the child node 615 and/or the like). The child node 615 may provide information identifying at least part of the resource pattern to the parent node 610, as described in more detail above.

As shown by reference number 635, the parent node 610 may communicate with the child node 615 based at least in part on the resource pattern. For example, the parent node 610 may identify a set of resources that are available for communication at the child node (e.g., that are not scheduled by the child node based at least in part on being soft at the child node or unavailable at the child node, or, in other words, being of the second group of time resources described above), and may schedule or perform a communication on the set of resources. In this way, the parent node 610 may identify available resources of the child node 615 without explicit (e.g., dynamic) signaling of the availability of such resources, thereby conserving signaling resources.

As shown by reference number 640, the parent node 610 may provide a release indication to the child node 615. For example, the release indication may be for a soft resource of the child node 615. In some aspects, the parent node 610 may provide the release indication based at least in part on determining that the parent node 610 is not to communicate with the child node 615 using the soft resource. For example, the soft resource of the child node 615 may be associated with a soft resource of the parent node 610 that was released, or may be associated with a hard time resource of the parent node 610 that is not to be used by the parent node 610. Thus, the parent node 610 may release the resource of the child node 615 when the resource is not to be used by the parent node 610, thereby improving efficiency of resource allocation of the child node 615.

As indicated above, FIG. 6 is provided as an example. Other examples may differ from what was described with respect to FIG. 6.

Figure 7:
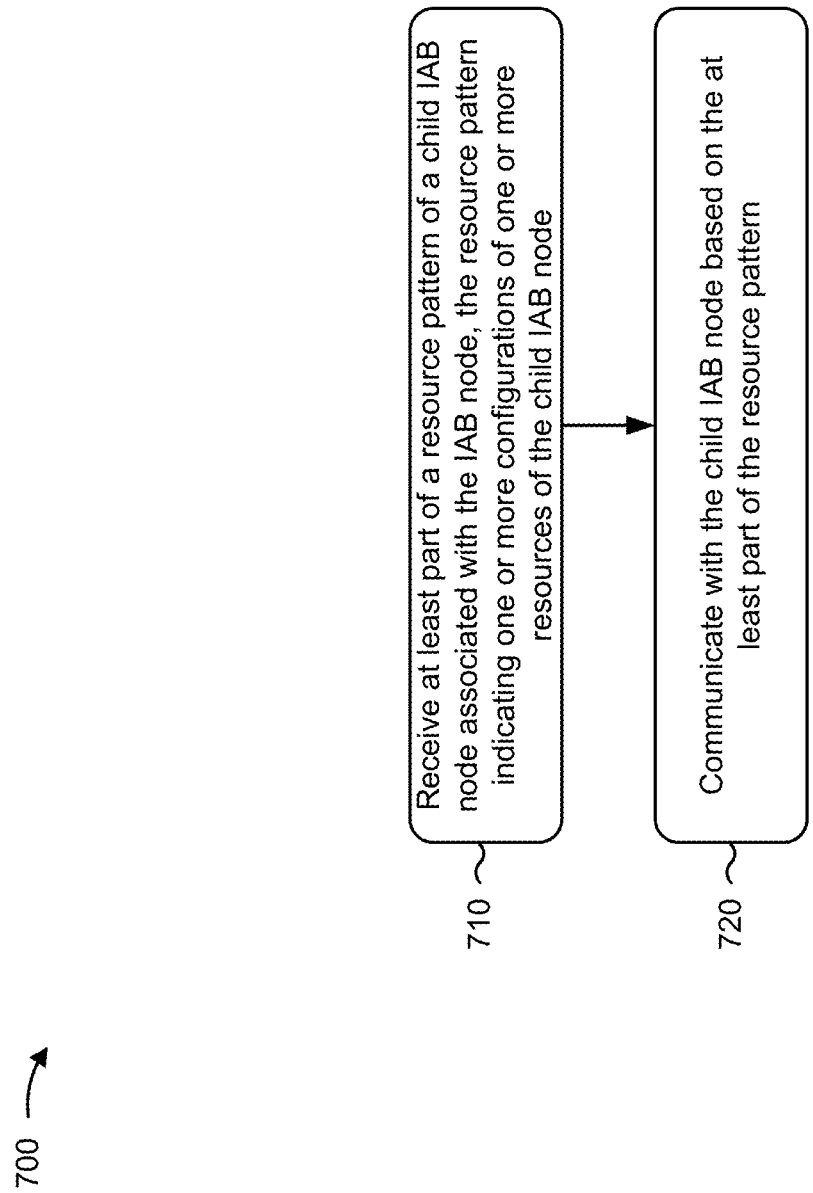
FIG. 7 is a diagram illustrating an example process performed, for example, by an IAB node, in accordance with various aspects of the present disclosure.

FIG. 7 is a diagram illustrating an example process 700 performed, for example, by an IAB node, in accordance with various aspects of the present disclosure. Example process 700 is an example where an IAB node (e.g., BS 110, base station 310, non-anchor base station 345, non-anchor node 410, a DU function 420, an MT function 415, parent node 610) performs configuration of resource patterns for integrated access and backhaul.

As shown in FIG. 7, in some aspects, process 700 may include receiving at least part of a resource pattern of a child IAB node associated with the IAB node, the resource pattern indicating one or more configurations of one or more resources of the child IAB node (block 710). For example, the IAB node (e.g., using antenna 234, DEMOD 232, MIMO detector 236, receive processor 238, controller/processor 240, and/or the like) may receive at least part of a resource pattern of a child IAB node associated with the IAB node, the resource pattern indicating one or more configurations of one or more resources of the child IAB node, as described above.

As further shown in FIG. 7, in some aspects, process 700 may include communicating with the child IAB node based on the at least part of the resource pattern (block 720). For example, the IAB node (e.g., using controller/processor 240, transmit processor 220, TX MIMO processor 230, MOD 232, antenna 234, and/or the like) may communicate with the child IAB node based on the at least part of the resource pattern, as described above.

Process 700 may include additional aspects, such as any single aspect or any combination of aspects described below and/or in connection with one or more other processes described elsewhere herein.

In a first aspect, receiving the at least part of the resource pattern further comprises receiving one or more messages that indicate the at least part of the resource pattern of the child IAB node from a central unit.

In a second aspect, alone or in combination with the first aspect, receiving the at least part of the resource pattern comprises receiving the at least part of the resource pattern, the resource pattern indicating that a set of resources, of the one or more resources of the child IAB node, are configurable in a schedulable state or a non-schedulable state for the child IAB node.

In a third aspect, alone or in combination with one or more of the first and second aspects, receiving the at least part of the resource pattern further comprises: receiving one or more messages from the child IAB node that indicate the at least part of the resource pattern.

In a fourth aspect, alone or in combination with one or more of the first through third aspects, receiving the one or more messages further comprises: receiving the one or more messages in connection with a request transmitted to the child IAB node by the IAB node.

In a fifth aspect, alone or in combination with one or more of the first through fourth aspects, the resource pattern indicates which resources of the child IAB node are unconditionally available for the child IAB node.

In a sixth aspect, alone or in combination with one or more of the first through fifth aspects, the resource pattern indicates which resources of the child IAB node are unconditionally unavailable for the child IAB node.

In a seventh aspect, alone or in combination with one or more of the first through sixth aspects, process 700 includes determining that the communication with the child IAB node is to be performed using a resource that is available for communication with the child IAB node based at least in part on the resource pattern.

In an eighth aspect, alone or in combination with one or more of the first through seventh aspects, receiving the at least part of the resource pattern comprises receiving the at least part of the resource pattern, the resource pattern indicating the resource is in a schedulable state.

In a ninth aspect, alone or in combination with one or more of the first through eighth aspects, communicating with the child IAB node further comprises: transmitting a release indication to the child IAB node for a time resource that is included in a set of soft resources identified by the resource pattern.

In a tenth aspect, alone or in combination with one or more of the first through ninth aspects, receiving the at least part of the resource pattern comprises receiving the at least part of the resource pattern, the resource pattern indicating the time resource is in a schedulable state.

In an eleventh aspect, alone or in combination with one or more of the first through tenth aspects, receiving the at least part of the resource pattern comprises receiving the at least part of the resource pattern, the resource pattern indicating the time resource is unconditionally available for the IAB node, wherein the method further comprises releasing the time resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
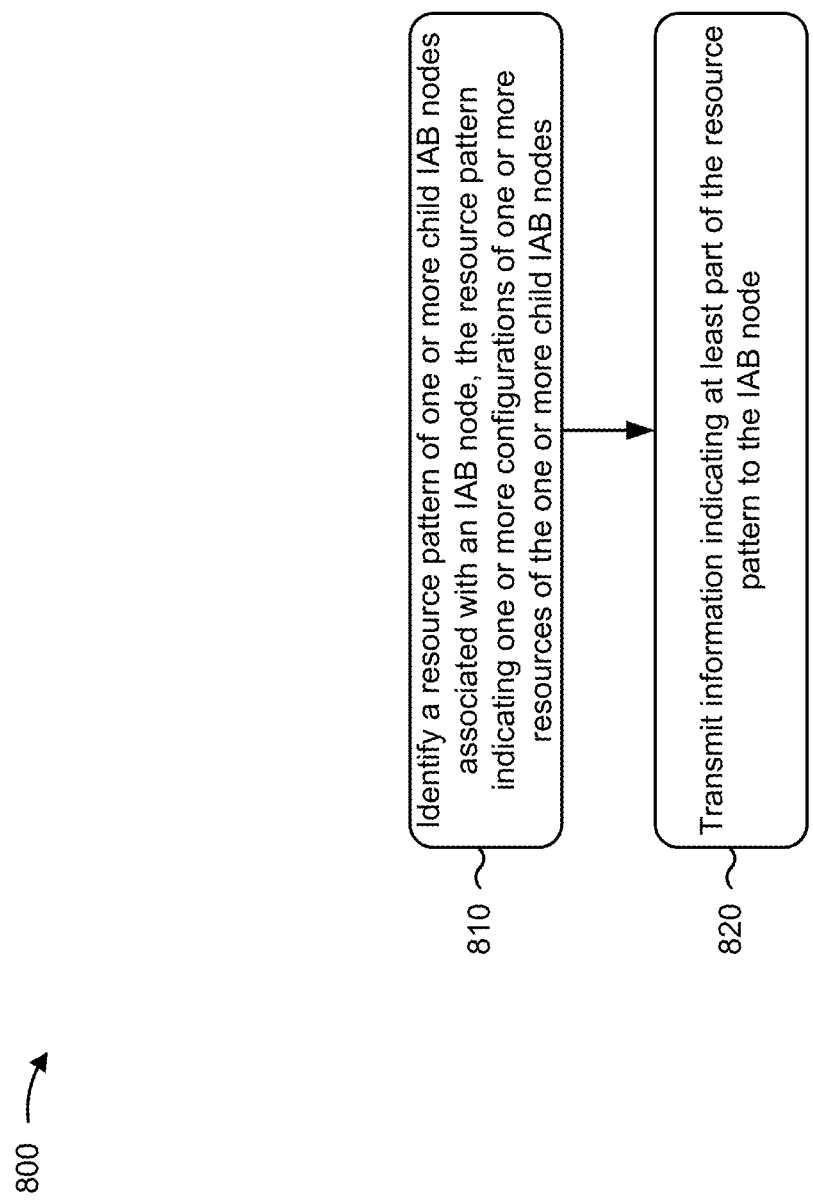
FIG. 8 is a diagram illustrating an example process performed, for example, by an IAB device, in accordance with various aspects of the present disclosure.

FIG. 8 is a diagram illustrating an example process 800 performed, for example, by an IAB device, in accordance with various aspects of the present disclosure. Example process 800 is an example where an IAB device (e.g., BS 110, network controller 130, anchor base station 335, anchor node 405, central entity 605, a central unit) performs configuration of resource patterns for integrated access and backhaul.

As shown in FIG. 8, in some aspects, process 800 may include identifying a resource pattern of one or more child IAB nodes associated with an IAB node, the resource pattern indicating one or more configurations of one or more resources of the one or more child IAB nodes (block 810). For example, the IAB device (e.g., using controller/processor 240 and/or the like) may identify a resource pattern of one or more child IAB nodes associated with an IAB node, the resource pattern indicating one or more configurations of one or more resources of the one or more child IAB nodes, as described above.

As further shown in FIG. 8, in some aspects, process 800 may include transmitting information indicating at least part of the resource pattern to the IAB node (block 820). For example, the IAB device (e.g., using controller/processor 240, transmit processor 220, TX MIMO processor 230, MOD 232, antenna 234, and/or the like) may transmit information indicating at least part of the resource pattern to the IAB node, as described above.

Process 800 may include additional aspects, such as any single aspect or any combination of aspects described below and/or in connection with one or more other processes described elsewhere herein.

In a first aspect, identifying the resource pattern further comprises identifying the resource pattern, the resource pattern indicating that a set of resources, of the one or more resources of the one or more child IAB nodes, are configurable in a schedulable state or a non-schedulable state for the one or more child IAB nodes.

In a second aspect, alone or in combination with the first aspect, process 800 includes transmitting at least part of the resource pattern of each child IAB node, of the one or more child IAB nodes, to the IAB node.

In a third aspect, alone or in combination with one or more of the first and second aspects, process 800 includes transmitting one or more messages indicating at least part of the resource pattern of a child IAB node, of the one or more child IAB nodes, to the child IAB node.

In a fourth aspect, alone or in combination with one or more of the first through third aspects, identifying the resource pattern further comprises: identifying the resource pattern, the resource pattern indicating which resources of the one or more child IAB nodes are unconditionally available for the one or more child IAB nodes.

In a fifth aspect, alone or in combination with one or more of the first through fourth aspects, identifying the resource pattern further comprises identifying the resource pattern, the resource pattern indicating which resources of the one or more child IAB nodes are unconditionally unavailable for the one or more child IAB nodes.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
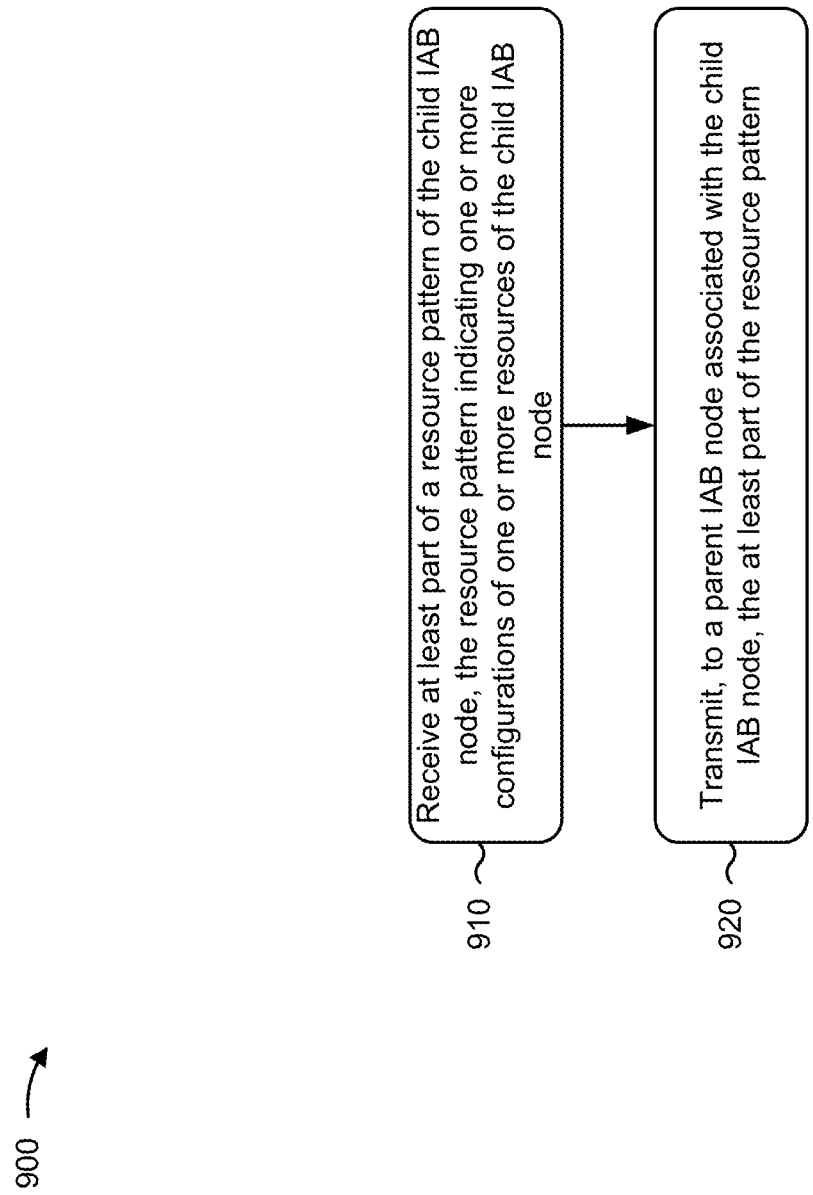
FIG. 9 is a diagram illustrating an example process performed, for example, by a child IAB node, in accordance with various aspects of the present disclosure.

FIG. 9 is a diagram illustrating an example process 900 performed, for example, by a child IAB node, in accordance with various aspects of the present disclosure. Example process 900 is an example where the child IAB node (e.g., BS 110, UE 120, base station 310, non-anchor base station 345, non-anchor node 410, a DU function 420, an MT function 415, child node 615) performs configuration of resource patterns for integrated access and backhaul.

As shown in FIG. 9, in some aspects, process 900 may include receiving at least part of a resource pattern of the child IAB node, the resource pattern indicating one or more configurations of one or more resources of the child IAB node (block 910). For example, the child IAB node (e.g., using antenna 234, DEMOD 232, MIMO detector 236, receive processor 238, controller/processor 240, and/or the like) may receive at least part of a resource pattern of the child IAB node, the resource pattern indicating one or more configurations of one or more resources of the child IAB node, as described above.

As further shown in FIG. 9, in some aspects, process 900 may include transmitting, to a parent IAB node associated with the child IAB node, the at least part of the resource pattern (block 920). For example, the child IAB node (e.g., using controller/processor 240, transmit processor 220, TX MIMO processor 230, MOD 232, antenna 234, and/or the like) may transmit, to a parent IAB node associated with the child IAB node, the at least part of the resource pattern, as described above.

Process 900 may include additional aspects, such as any single aspect or any combination of aspects described below and/or in connection with one or more other processes described elsewhere herein.

In a first aspect, process 900 includes communicating with the parent IAB node based at least in part on the at least part of the resource pattern.

In a second aspect, alone or in combination with the first aspect, process 900 includes receiving, from the parent IAB node, a request for the at least part of the resource pattern, wherein transmitting the at least part of the resource pattern is based at least in part on receiving the request.

In a third aspect, alone or in combination with one or more of the first and second aspects, receiving the at least part of the resource pattern comprises: receiving the at least part of the resource pattern, the resource pattern indicating that a set of resources, of the one or more resources of the child IAB node, are configurable in a schedulable state or a non-schedulable state for the child IAB node.

In a fourth aspect, alone or in combination with one or more of the first through third aspects, receiving the at least part of the resource pattern comprises: receiving the at least part of the resource pattern, the resource pattern indicating which resources of the child IAB node are unconditionally available for the child IAB node.

In a fifth aspect, alone or in combination with one or more of the first through fourth aspects, receiving the at least part of the resource pattern comprises: receiving the at least part of the resource pattern, the resource pattern indicating which resources of the child IAB node are unconditionally unavailable for the child IAB node.

In a sixth aspect, alone or in combination with one or more of the first through fifth aspects, process 900 includes receiving a release indication from the parent IAB node for a resource that is included in a set of soft resources identified by the resource pattern.

In a seventh aspect, alone or in combination with one or more of the first through sixth aspects, receiving the at least part of the resource pattern comprises: receiving the at least part of the resource pattern, the resource pattern indicating the resource is in a schedulable state.

In an eighth aspect, alone or in combination with one or more of the first through seventh aspects, the release indication indicates that the resource is released by the parent IAB node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
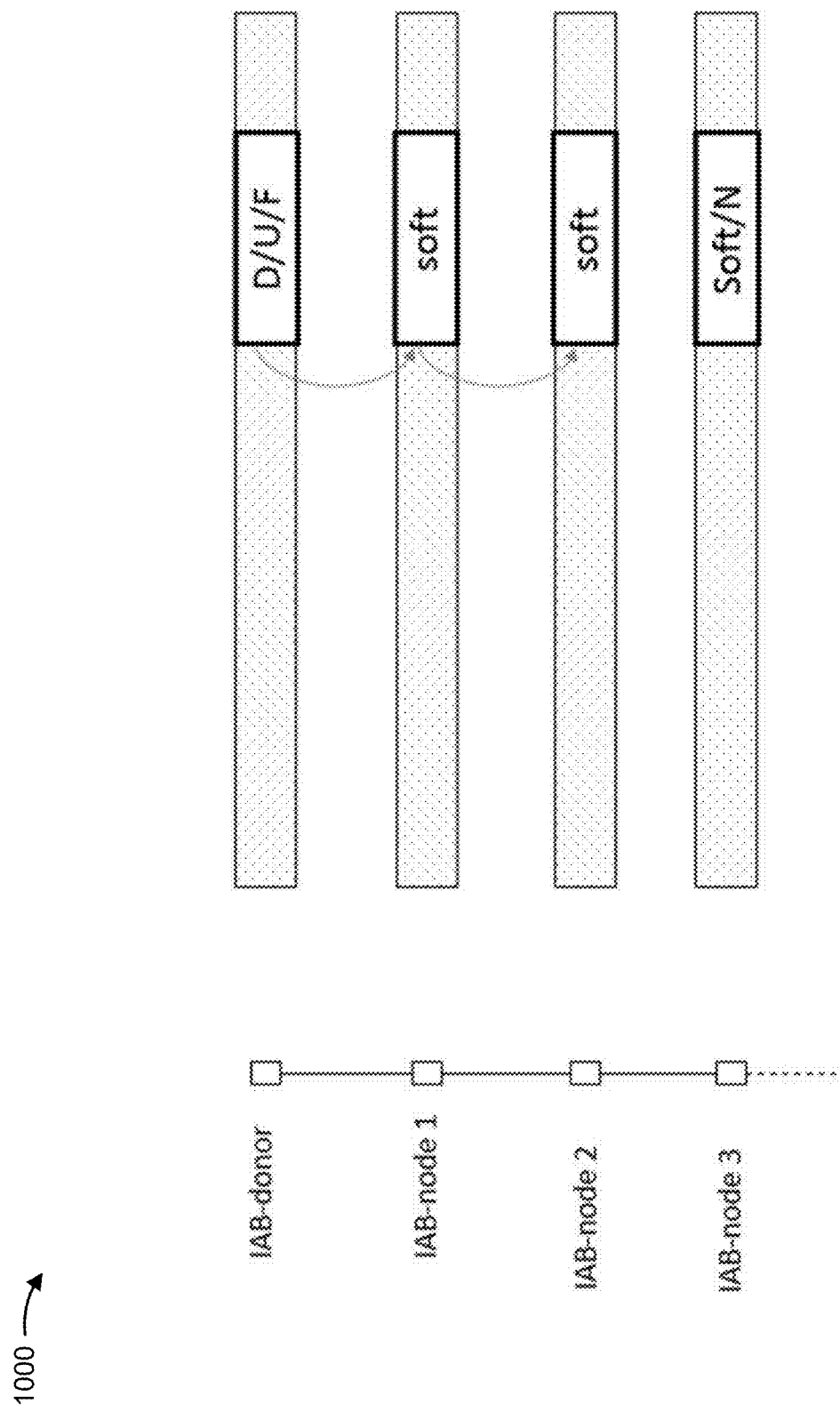
FIG. 10 is a diagram illustrating an example of resource pattern alignment in an IAB network, in accordance with various aspects of the disclosure.

FIG. 10 is a diagram illustrating an example 1000 of resource pattern alignment in an IAB network, in accordance with various aspects of the disclosure. FIG. 10 shows a chain of parent nodes and child nodes. A set of time resources is represented by the horizontal rectangle next to each node. For example, the same set of time resources is represented for each node. Thus, a same part of the time resources may represent the same time resources for two or more IAB nodes.

The IAB-donor may include a CU or IAB donor, described in more detail elsewhere herein. IAB-node 1 is a parent node of IAB-node 2, and IAB-node 2 is a parent node of IAB-node 3. As shown, the IAB-donor may be configured with a set of downlink/uplink/flexible time resources (e.g., hard time resources). As further shown, the IAB-donor may configure the IAB-node 1 with soft resources corresponding to the set of downlink/uplink/flexible time resources. As shown, the IAB-node 1 or another device (e.g., the IAB-donor, etc.) may configure the IAB-node 2 with soft resources corresponding to the soft resources of the IAB-node 1. As further shown, the IAB-node 2 or another device (e.g., the IAB-donor, the IAB-node 1, etc.) may configure the IAB-node 3 with soft resources or non-schedulable resources corresponding to the soft resources of the IAB-node 2.

In this way, uncertainty regarding a released time resource (e.g., the hard time resources of the IAB-donor, and/or the soft resources of one of the IAB-nodes) may be avoided. For example, since all of the nodes are associated with soft resources or non-schedulable time resources in the appropriate time resources, each of the nodes may know that the time resources can be released if unused, or can be scheduled if needed. This may reduce the flexibility of resource allocation of the IAB network in comparison to other techniques and apparatuses described herein, and may reduce signaling overhead.

As indicated above, FIG. 10 is provided as an example. Other examples are possible and may differ from what was described with regard to FIG. 10.

Figure 11:
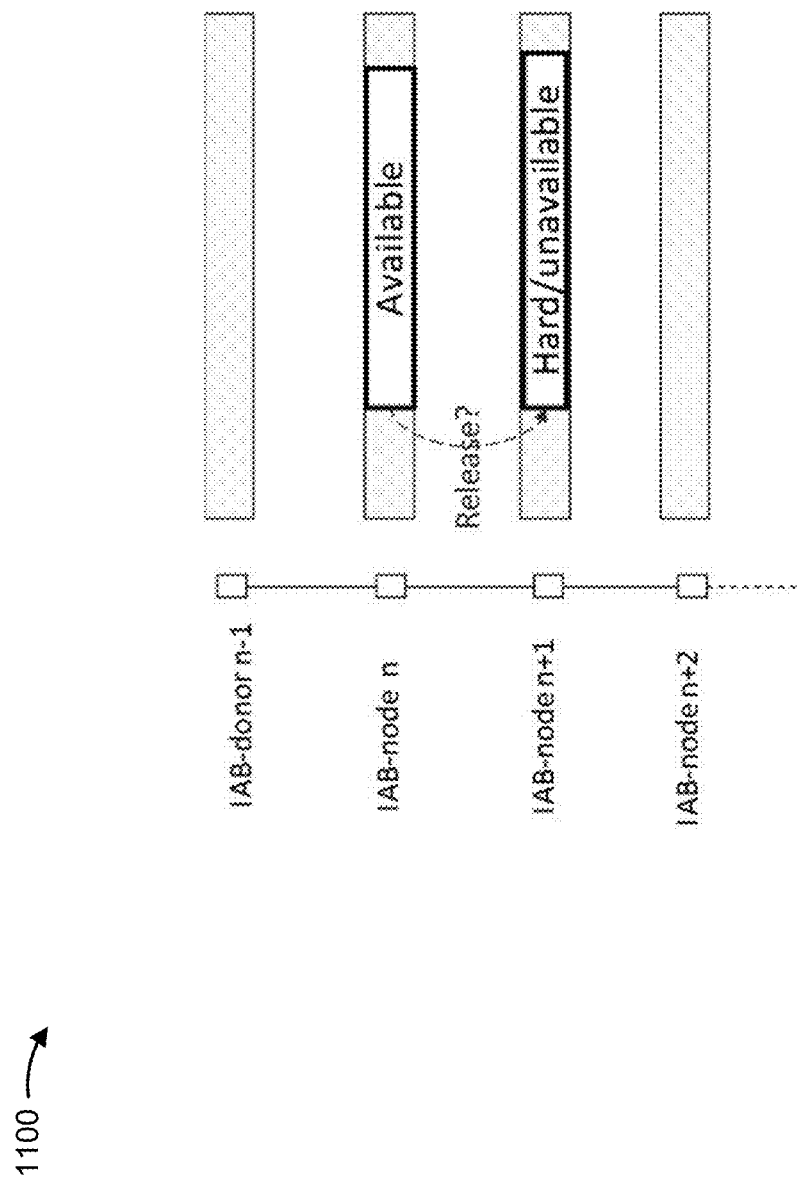
FIG. 11 is a diagram illustrating an example of a resource configuration for a set of IAB nodes.

FIG. 11 is a diagram illustrating an example 1100 of a resource configuration for a set of IAB nodes. FIG. 11 shows a chain of parent nodes and child nodes. A set of time resources is represented by the horizontal rectangle next to each node. For example, the same set of time resources is represented for each node. Thus, a same part of the time resources may represent the same time resources for two or more IAB nodes.

The IAB-donor may include a CU or IAB donor, described in more detail elsewhere herein. IAB-node n is a parent node of IAB-node n+1, and IAB-node n+1 is a parent node of IAB-node n+2. In this example, IAB-node n may be informed of the resource configuration (e.g., resource pattern) of IAB-node n+1. Thus, IAB-node n may not need to transmit a release indication to IAB-node n+1, thereby conserving network resources.

As indicated above, FIG. 11 is provided as an example. Other examples may differ from what is described with regard to FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
receiving, by a parent node in an integrated access and backhaul (IAB) network and directly from a central unit using an F1 application protocol (F1-AP), at least part of a resource pattern of a child IAB node of the parent node,
receiving the at least part of the resource pattern directly from the central unit using the F1-AP being different from receiving the at least part of the resource pattern from the child IAB node that receives the at least part of the resource pattern from the central unit,
the resource pattern indicating one or more configurations of one or more resources of the child IAB node to be used for communication by the child IAB node with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to the child IAB node by the parent node, and
the hard resource being unconditionally available for the child IAB node; and
communicating with the child IAB node based on the at least part of the resource pattern.

2. The method of claim 1, wherein receiving the at least part of the resource pattern further comprises:
receiving one or more messages that indicate the at least part of the resource pattern of the child IAB node.

3. The method of claim 1, wherein the resource pattern indicates that the one or more resources further include another resource that is unconditionally unavailable for the child IAB node.

4. The method of claim 1, further comprising:
determining that the communication with the child IAB node is to be performed using a resource that is available for communication with the child IAB node based at least in part on the resource pattern.

5. The method of claim 4, wherein the resource pattern indicates that the resource is in a schedulable state.

6. The method of claim 1, wherein communicating with the child IAB node further comprises:
transmitting the availability indication to the child IAB node for a time resource that is included in a set of soft resources identified by the resource pattern, the time resource being the soft resource.

7. The method of claim 6, wherein receiving the at least part of the resource pattern comprises:
receiving the at least part of the resource pattern, the resource pattern indicating the time resource is in the schedulable state.

8. The method of claim 1, wherein the resource pattern indicates a time resource that is unconditionally available for the parent node,
wherein the method further comprises releasing the time resource.

9. A method of wireless communication, comprising:
identifying, by a central entity that is an integrated access and backhaul (IAB) device, a resource pattern of one or more child IAB nodes of a parent node in an IAB network,
the resource pattern indicating one or more configurations of one or more resources of the one or more child IAB nodes to be used for communication by the one or more child IAB nodes with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to a child IAB node, of the one or more child IAB nodes, by the parent node, and
the hard resource being unconditionally available for the child IAB node; and
transmitting, by the central entity, information indicating at least part of the resource pattern directly to the parent node using an F1 application protocol (F1-AP),
transmitting the information indicating the at least part of the resource pattern directly to the parent node using the F1-AP being different from transmitting the at least part of the resource to the child IAB node that transmits the at least part of the resource pattern to the parent node.

10. The method of claim 9, further comprising:
transmitting one or more messages indicating at least part of the resource pattern of the child IAB node to the child IAB node.

11. The method of claim 9, wherein the resource pattern indicates that the one or more resources further include another resource that is unconditionally unavailable for the one or more child IAB nodes.

12. A parent node in an integrated access and backhaul (IAB) network, the parent node comprising:
a memory; and
one or more processors coupled to the memory, the memory and the one or more processors configured to:
receive, directly from a central unit using an F1 application protocol (F1-AP), at least part of a resource pattern of a child IAB node of the parent node,
configuring the memory and the one or more processors to receive the at least part of the resource pattern directly from the central unit using the F1-AP being different from configuring the memory and the one or more processors to receive the at least part of the resource pattern from the child IAB node that receives the at least part of the resource pattern from the central unit,
the resource pattern indicating one or more configurations of one or more resources, of the child IAB node, to be used for communication of the child IAB node with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to the child IAB node by the parent node, and
the hard resource being unconditionally available for the child IAB node; and
communicate with the child IAB node based on the at least part of the resource pattern.

13. The parent node of claim 12, wherein the memory and the one or more processors, when receiving the at least part of the resource pattern, are further to:
receive one or more messages that indicate the at least part of the resource pattern of the child IAB node.

14. The method of claim 1, wherein the resource pattern indicates that the soft resource is configured as downlink-only, uplink-only, or flexible.

15. The method of claim 9, wherein the resource pattern indicates that the soft resource is configured as a soft flexible time resource.

16. The parent node of claim 12, wherein the resource pattern indicates that the one or more resources further include an unavailable resource.

17. The parent node of claim 12, wherein, when receiving the at least part of the resource pattern of the child IAB node, the memory and the one or more processors are configured to:
receive, directly from the central unit using the F1-AP, information identifying resource patterns of all child nodes of the parent node,
wherein the resource patterns include the resource pattern.

18. The method of claim 1,
wherein receiving the at least part of the resource pattern of the child IAB node comprises:
receiving, directly from the central unit using the F1-AP, information identifying resource patterns of all child nodes of the parent node,
wherein the resource patterns include the resource pattern.

19. The method of claim 9, further comprising:
transmitting, by the central entity, information indicating other resource patterns, of all other child IAB nodes associated with the parent node, directly to the parent node using the F1-AP.

20. An apparatus comprising:
means for receiving, directly from a central unit using an F1 application protocol (F1-AP), at least part of a resource pattern of a child IAB node of the apparatus,
the means for receiving the at least part of the resource pattern directly from the central unit using the F1-AP being different from means for receiving the at least part of the resource pattern from the child IAB node that receives the at least part of the resource pattern from the central unit,
the resource pattern indicating one or more configurations of one or more resources of the child IAB node to be used for communication by the child IAB node with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to the child IAB node by the apparatus, and
the hard resource being unconditionally available for the child IAB node; and
means for communicating with the child IAB node based on the at least part of the resource pattern.

21. The apparatus of claim 20, wherein the resource pattern indicates that the one or more resources further include another resource that is unconditionally unavailable for the child IAB node.

22. The apparatus of claim 20, further comprising:
means for determining that the communication with the child IAB node is to be performed using a resource that is available for communication with the child IAB node based at least in part on the resource pattern.

23. The apparatus of claim 20,
wherein the means for receiving the at least part of the resource pattern of the child IAB node comprises:
means for receiving, directly from the central unit using the F1-AP, information identifying resource patterns of all child nodes of the apparatus, and
wherein the resource patterns include the resource pattern.

24. The apparatus of claim 20, wherein the means for communicating with the child IAB node comprises:
means for transmitting the availability indication to the child IAB node for a time resource that is included in a set of soft resources identified by the resource pattern, the time resource being the soft resource.

25. The parent node of claim 12, wherein, when communicating with the child IAB node, the memory and the one or more processors are configured to:
transmit the availability indication to the child IAB node for a time resource that is included in a set of soft resources identified by the resource pattern, the time resource being the soft resource.

26. A non-transitory computer-readable medium storing one or more instructions for wireless communication, the one or more instructions comprising:
one or more instructions that, when executed by a parent node in an integrated access and backhaul (IAB) network, cause the parent node to:
receive, directly from a central unit using an F1 application protocol (F1-AP), at least part of a resource pattern of a child IAB node of the parent node,
the one or more instructions to receive the at least part of the resource pattern directly from the central unit using the F1-AP being different from one or more instructions to receive the at least part of the resource pattern from the child IAB node that receives the at least part of the resource pattern from the central unit,
the resource pattern indicating one or more configurations of one or more resources, of the child IAB node, to be used for communication by the child IAB node with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to the child IAB node by the parent node, and
the hard resource being unconditionally available for the child IAB node; and
communicate with the child IAB node based on the at least part of the resource pattern.

27. A central entity comprising:
a memory; and
one or more processors coupled to the memory, the memory and the one or more processors configured to:
identify a resource pattern of one or more child integrated access and backhaul (IAB) nodes associated with a parent node in an IAB network,
the resource pattern indicating one or more configurations of one or more resources of the one or more child IAB nodes to be used for communication by the one or more child IAB nodes with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to a child IAB node, of the one or more child IAB nodes, by the parent node, and
the hard resource being unconditionally available for the child IAB node; and
transmit information indicating at least part of the resource pattern directly to the parent node using an F1 application protocol (F1-AP),
configuring the memory and the one or more processors to transmit the information indicating the at least part of the resource pattern directly to the parent node using the F1-AP being different from configuring the memory and the one or more processors to transmit the at least part of the resource to the child IAB node that transmits the at least part of the resource pattern to the parent node.

28. An apparatus comprising:
means for identifying a resource pattern of one or more child integrated access and backhaul (IAB) nodes associated with a parent node in an IAB network,
the resource pattern indicating one or more configurations of one or more resources of the one or more child IAB nodes to be used for communication by the one or more child IAB nodes with one or more other wireless nodes,
the one or more resources including a soft resource and a hard resource,
the soft resource being in one of two states: a schedulable state or a non-schedulable state,
the soft resource being in the schedulable state after an availability indication is explicitly or implicitly provided to a child IAB node, of the one or more child IAB nodes, by the parent node, and
the hard resource being unconditionally available for the child IAB node; and
means for transmitting information indicating at least part of the resource pattern directly to the parent node using an F1 application protocol (F1-AP),
the means for transmitting the information indicating the at least part of the resource pattern directly to the parent node using the F1-AP being different from means for transmitting the at least part of the resource to the child IAB node that transmits the at least part of the resource pattern to the parent node.

29. A non-transitory computer-readable medium storing one or more instructions for wireless communication, the one or more instructions comprising:
one or more instructions that, when executed by a central entity, cause the central entity to:
identify a resource pattern of one or more child integrated access and backhaul (IAB) nodes associated with a parent node in an IAB network, the resource pattern indicating one or more configurations of one or more resources of the one or more child IAB nodes to be used for communication by the one or more child IAB nodes with one or more other wireless nodes, the one or more resources including a soft resource and a hard resource, the soft resource being in one of two states: a schedulable state or a non-schedulable state, the soft resource being in the schedulable state after an availability indication is explicitly or implicitly provided to a child IAB node, of the one or more child IAB nodes, by the parent node, and the hard resource being unconditionally available for the child IAB node; and transmit information indicating at least part of the resource pattern directly to the parent node using an F1 application protocol (F1-AP), the one or more instructions to transmit the information indicating the at least part of the resource pattern directly to the parent node using the F1-AP being different from one or more instructions to transmit the at least part of the resource to the child IAB node that transmits the at least part of the resource pattern to the parent node.

30. The non-transitory computer-readable medium of claim 26, wherein the one or more instructions further cause the parent node to:

determine that the communication with the child IAB node is to be performed using a resource that is available for communication with the child IAB node based at least in part on the resource pattern.

31. The central entity of claim 27, wherein the memory and the one or more processors are further configured to:

transmit one or more messages indicating at least part of the resource pattern of the child IAB node to the child IAB node.

32. The central entity of claim 27, wherein the resource pattern indicates that the one or more resources further include another resource that is unconditionally unavailable for the one or more child IAB node.

33. The apparatus of claim 28, further comprising:

means for transmitting one or more messages indicating at least part of the resource pattern of the child IAB node to the child IAB node.

34. The apparatus of claim 28, wherein the resource pattern indicates that the one or more resources further include another resource that is unconditionally unavailable for the one or more child IAB node.

35. The non-transitory computer-readable medium of claim 29, wherein the one or more instructions further cause the central entity to:

transmit one or more messages indicating at least part of the resource pattern of the child IAB node to the child IAB node.

36. The non-transitory computer-readable medium of claim 29, wherein the resource pattern indicates that the one or more resources further include another resource that is unconditionally unavailable for the one or more child IAB node.

* * * * *